United States Patent

Potin et al.

[11] 3,855,182
[45] Dec. 17, 1974

[54] PROCESS FOR OBTAINING POLYAMIDES FROM LACTAMS

[75] Inventors: M. Philippe Potin; M. Michel Biesan, both of Billiere, France

[73] Assignee: Societe Aquitane-Total-Organico Tour Aquitaine, Courbevoie, France

[22] Filed: Aug. 16, 1972

[21] Appl. No.: 281,225

[30] Foreign Application Priority Data
Aug. 25, 1971  France .............................. 71.30754

[52] U.S. Cl............. 260/78 L, 260/45.85, 260/78 P
[51] Int. Cl........................................... C08g 20/18
[58] Field of Search............... 260/78 L, 78 P, 48.85

[56] References Cited
UNITED STATES PATENTS
3,207,729  9/1965  Giberson .......................... 260/78 L Primary Examiner—Lucille M. Phynes

[57] ABSTRACT

This invention concerns a process for obtaining polyamides, in which the polymer is mixed with one or more substances with the general formula:

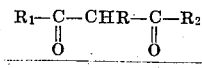

where $R_1$ and $R_2$ are organic radicals, and R is an organic radical or hydrogen.

9 Claims, No Drawings

PROCESS FOR OBTAINING POLYAMIDES FROM LACTAMS

This invention concerns an improved process for obtaining polyamides. More specifically, it concerns an improved process for obtaining polyamides from lactames with at least 4 carbon atomes in the ring, particularly caprolactame and/or dodecalactame.

It also concerns polyamides obtained in this way, and films, bands, fibres and moulded objects made from them.

ε-caprolactame can be used to obtain substances with a high molecular weight, when the lactame is heated in an anhydrous medium in the presence of substances setting an alkaline ion free, such as sodium, sodium hydride, sodium and potassium alcoholate, and particularly in the presence of a sodium salt of the lactame used. Polymerization can take place at temperatures between 220° and 250°C, or at lower temperatures, between 150° and 180°C, if an activator is added.

The 6-polyamides obtained in this manner are rather unsatisfactory, since their viscosity is unstable. During the subsequent treatments at usually fairly high temperatures, to which such polyamides are subjected in the making of fibres, films, sheets, moulded objected, etc, the molecular weight is found to decrease rapidly, and it is almost impossible to obtain uniform viscosity in the molten state within a reasonable period of time. This drawback arises from the fact that the polymerization is an equilibrium reaction, with the equilibrium adjusting to produce lactame when the temperature rises. At 230°C, for instance, approximately 10 % monomer lactame is found in the molten polymer.

This equilibrium reaction makes it impossible to remove the caprolactame in the anionic 6-nylon by degassing, since the equilibrium is immediately reestablished by depolymerization, as the monomer is extracted.

To prevent the decomposition of the polymer that occurs in existing processes, it has to be washed with an acidified aqueous solution, to eliminate the sodium. This has to be followed by washing with water and drying, which considerably increases the cost of the polyamide.

In the case of dodecalactame, it is also possible to obtain polyamides with high molecular weight, when the lactame is heated in an anhydrous medium, in the presence of substances setting an alkaline ion free, such as sodium hydride or alcoholate, or the sodium salt of the lactame used. Polymerization can take place at temperatures between 230° and 270°C, or at lower temperatures if an activator is added.

No depolymerization occurs in the 12-polyamides obtained by this process, but there is a completely chaotic development of the melting viscosity of the polymer and its viscosity in solution, resulting from a simultaneous process of chain breakage and disorderly branchings.

This invention concerns an improved process for obtaining polyamides with high molecular weight, in which these objections can be overcome. The process is of particular interest because it can be applied to the anionic polymerization, in an anhydrous medium and in the presence of alkaline catalysts, of all lactames, producing polyamides with completely stable viscosity in the molten state. The process can be used in particular to obtain polymers and copolymers from caprolactame, capryllactame and/or dodecalactame, for instance.

This invention concerns a process for obtaining polyamides by anionic polymerization of lactames in an anhydrous medium, in the presence of alkaline catalysts, usually sodium catalysts, and possibly activators, characterized by the fact that the polymer is mixed with one or more compounds with the general formula:

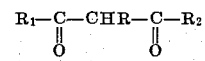

where $R_1$ and $R_2$ are organic radicals and R is an organic radical or hydrogen.

In one embodiment of the invention, the radicals $R_1$ and $R_2$ are aliphatic radicals or radicals with the formula:

$$O-R'_1 \text{ and/or } O-R'_2$$

where $R'_1$ and $R'_2$ are aliphatic radicals.

In another embodiment of the invention, the substances used are one or more compounds such as ethyl malonate, ethyl acetyl acetate and acetyl acetone.

According to one feature of the invention, these substances are added to the polyamide in ratios of between 0.05 and 2 moles, and preferably 0.2 to 1 mole, per 100 moles of the initial lactame; the proportions depend on the quantity of sodium present at the begining.

In one embodiment of the invention, the substances are added at the end of polymerization, by being mixed with the molten polymer in the polymerization reactor.

In another embodiment of the invention, the substances are added to the polymer by being made into a paste, followed by mixing or extrusion.

The invention also concerns fibres, films, sheets, moulded objects and other products made from polyamides produced by this process.

Other purposes and advantages of the invention will be shown by the following examples representing some embodiments of the invention, which, however, is in no way confined to these examples.

Unless otherwise stated, the inherent viscosity η was measured at 20°C, using 0.5 % solutions in m-cresol.

The flow index of the polyamides was measured, namely the weight of product flowing through a 1.35 mm nozzle at a temperature of 240°C, when a pressure of 2 kg/sq.cm is applied.

EXAMPLES 1 and 2

Dodecalactame was polymerized anionically in a Grignard reactor at 240°C, using a catalyst containing 1 % moles of sodium. When polymerization was completed, the product was extruded through a nozzle at the base of the reactor.

For the stabilizing agent test, the agent was added to the molten polymer, and homogenized for 30 minutes. Samples were then taken, after 1, 2, 3 and 4 hours.

Example 1 was a control test done for comparison purposes, in which the polymer was extruded without any of the substances proposed in this invention being added.

In example 2, the stabilizing agent was 1 % moles of ethyl malonate.

Table 1

| Time in hours | | 0 | 1 | 2 | 3 | 4 |
|---|---|---|---|---|---|---|
| Flow index (g/mn) | Example 1 (control) | 75 | 35 | 21 | 13 | 0 |
| | Example 2 (with ethyl malonate) | 91 | 113 | 112 | 80 | 68 |

EXAMPLES 3 and 4

12-nylon was obtained by anionic polymerization of dodecalactame in the presence of 0.72 % moles of sodium, and extruded at 230°C, in the same way as in examples 1 and 2.

Example 3 was a control test done for comparison purposes, in which the polymer was extruded without any of the substances proposed in this invention being added.

In example 4, the stabilizing agent was 1 % moles of ethyl acetyl acetate.

The inherent viscosity was measured at 20°C, using 0.5 % solutions in m-cresol.

The results are shown in table 2 below.

Naturally, the invention is in no way confined to these embodiments: many alternative forms are possible, for someone skilled in the art, without any departure from the spirit of the invention.

Table 2

| Example | Stabilizing agent | Non-extruded | 1st extrusion | 2nd extrusion |
|---|---|---|---|---|
| 3 | control | 1.41 | 1.22 | 1.20 |
| 4 | 1 % moles of ethyl acetyl acetate | 1.41 | 1.34 | 1.30 |

The substances which according to the present invention are mixed with the polymer are under the circumstances, more acid than the amide functions of the polymers and lactames and produce only limited or no acidolysis of the polymer chain.

What is claimed is:

1. A process for obtaining high molecular weight polyamides which comprises anionically polymerizing at least one lactam having at least 4 carbon atoms in the ring in the presence of an alkali catalyst and mixing the resulting polymer with at least one compound of the formula:

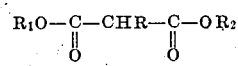

wherein $R_1$ and $R_2$ are each lower alkyl and R is hydrogen or lower alkyl.

2. A process as defined in claim 1, in which the R is hydrogen.

3. A process as defined in claim 1, in which the lactam is polymerized in an anhydrous medium, in the presence of sodium catalysts.

4. A process as defined in claim 1, in which said compound is ethyl malonate.

5. A process as defined in claim 1, in which the lactam is a member of the group consisting of caprolactam, dodecalactam and capryllactam.

6. A process as defined in claim 1, in which said compound is added to the polymer at the ratio of between 0.05 and 2 moles to 100 moles of the initial lactame.

7. A process as defined in claim 6, in which between 0.2 and 1 mole of said compound per 100 moles of lactame are added.

8. A process as defined in claim 1, in which said compound is added after polymerization, by being mixed with the molten polymer in the polymerization reactor.

9. A process as defined in claim 1, in which said compound is added to the polymer by being made into a paste, followed by mixing or extrusion.

* * * * *